United States Patent [19]

Mizutani et al.

[11] Patent Number: 5,179,050

[45] Date of Patent: Jan. 12, 1993

[54] SIC-BASED PRESSURELESS SINTERED PRODUCT

[75] Inventors: Toshiaki Mizutani; Akihiko Tsuge, both of Yokohama, Japan

[73] Assignee: Kabushiki Kaisha Toshiba, Kawasaki, Japan

[21] Appl. No.: 567,811

[22] Filed: Aug. 15, 1990

[30] Foreign Application Priority Data

Aug. 18, 1989 [JP] Japan .................. 1-211426
Sep. 18, 1989 [JP] Japan .................. 1-239862
Feb. 8, 1990 [JP] Japan .................. 2-27159

[51] Int. Cl.$^5$ .................. C04B 35/56; C04B 35/58
[52] U.S. Cl. .................. 501/91; 501/90; 501/92
[58] Field of Search .................. 501/90, 91, 92

[56] References Cited

U.S. PATENT DOCUMENTS

| 4,379,852 | 4/1983 | Watanabe et al. | 501/91 |
| 4,555,358 | 11/1985 | Matsushita et al. | 501/91 |
| 4,705,761 | 10/1987 | Kosugi | 501/87 |
| 4,729,972 | 3/1988 | Kodama et al. | 501/91 |
| 4,963,516 | 10/1990 | Kawasaki | 501/91 |

FOREIGN PATENT DOCUMENTS

| 59-131578 | 7/1984 | Japan | 501/91 |
| 64-87562 | 3/1989 | Japan . | |
| 64-87563 | 3/1989 | Japan . | |
| 64-87564 | 3/1989 | Japan . | |

*Primary Examiner*—Mark L. Bell
*Attorney, Agent, or Firm*—Oblon, Spivak, McClelland, Maier & Neustadt

[57] ABSTRACT

An SiC-based pressureless sintered product contains a sintered product main component containing grains of at least one additive selected from the group consisting of TaC, $NbB_2$, $VB_2$ and WB and the balance of SiC sintered grains constituting a SiC matrix, and a sintering assistant component. The additive grains have a maximum grain size not greater than an average grain size of the SiC sintered grains.

14 Claims, No Drawings

SIC-BASED PRESSURELESS SINTERED PRODUCT

BACKGROUND OF THE INVENTION

1. Field of the Invention

The present invention relates to an SiC-based pressureless sintered product having high toughness and high strength.

2. Description of the Related Art

An SiC-based sintered product has good characteristics in, e.g., an oxidation resistance, a corrosion resistance, and a thermal shock resistance and is expected to be a high-temperature structural material for use in gas turbine parts, a high-temperature heat exchanger, and the like. As a result of recent studies of such an SiC-based sintered product, it is found that the simultaneous addition of B and C elements is particularly effective, and various types of high-density SiC-based sintered products have been realized by using a sintering assistant of this type. Although various types of improvements and modifications in characteristics have been made to put SiC-based sintered products into practical use as described above, toughness of such SiC-based sintered products has not been improved yet.

A large number of methods of solving this problem have been reported so far. For example, each of Published Unexamined Japanese Patent Application Nos. 64-87562, 64-87563, and 64-87564 discloses a nonoxide-based composite sintered product formed by combining a transition metal carbide or boride such as TaC, NbB$_2$, or VB$_2$ as a second phase component in SiC. According to these publications, a powder of a second phase component as described above having an average grain size of 3 to 8 μm is dispersed in an SiC powder and the mixture is hot-pressed to form a high-density composite sintered product having a high toughness value. Although the toughness of this composite sintered product is improved, however, its fracture strength is still insufficient and largely reduced at high temperatures. In addition, since this sintered product is a hot-pressed product having a limited shape, it has not been satisfactorily practical. Although many other attempts have been made to improve the toughness of SiC-based sintered products, they all have both advantages and disadvantages, and the above conventional problem of low toughness has not been solved yet.

As described above, the problem of low toughness of the conventional SiC-based sintered product prevents its practical use, and many methods of improving the toughness have been reported. According to these methods, however, although the toughness of the sintered product is improved, another problem of low strength or the like arises. As a result, no method of obtaining high toughness in an SiC-based sintered product without degrading its various characteristics has been achieved.

SUMMARY OF THE INVENTION

Accordingly, it is an object of the present invention to provide an SiC-based pressureless sintered product having high toughness and high strength.

According to the present invention, there is provided an SiC-based pressureless sintered product comprising a sintered product main component containing grains of at least one additive selected from the group consisting of TaC, NbB$_2$, VB$_2$ and WB and the balance of SiC sintered grains constituting a SiC matrix; and a sintering assistant or aid component; said additive grains having a maximum grain size not greater than an average grain size of the SiC sintered grains.

In a first embodiment of the invention, the additive is TaC and is contained in an amount of 0.06 to 15 mol % in the main component.

In a second embodiment, the additive is the boride, i.e., NbB$_2$, VB$_2$ and/or WB, and is contained in an amount of 0.06 to 25 mol % in the main component.

The present invention is characterized in that a maximum grain size of the second phase component grains dispersed to improve toughness of the SiC-based sintered product is equal to or smaller than an average grain size of the SiC matrix and the SiC-based sintered product is manufactured by pressureless sintering.

DETAILED DESCRIPTION OF THE PREFERRED EMBODIMENTS

The present inventors have studied a cause which reduces strength of an SiC-based sintered product when a transition metal carbide or boride having a toughness improving effect is added to SiC, and obtained the following findings.

In general, a fracture strength of a sintered product depends on a toughness value $K_{1c}$, a degree of grain growth of the matrix grains, and a maximum defect in the sintered product. That is, the fracture strength of is represented by the following equation (*):

$$\sigma f = \frac{K_{1c}}{Y\sqrt{(C_0 + g)}} \quad (*)$$

where:

g is a factor of micro-structure representing the degree of grain growth the matrix grains;

$C_0$ is the maximum defect size in the sintered product, and

Y is a pattern factor of maximum defect.

In the above equation, since the maximum defect size $C_0$ is negligible under an ideal condition of $C_0 < < g$, strength reduction largely depends on the factor of micro-structure, g. In this case, if abnormal grain growth occurs to form large grains during sintering to obtain the sintered product, the value of the factor of micro-structure, g, is increased to reduce the fracture strength of. In the SiC-based sintered product, however, an average grain size can be reduced to be about 10 μm or less by normally performing control upon sintering. If the control is particularly precisely performed, grains having an average grain size of about 5 μm, a small aspect ratio, and isotropy can be formed. Therefore, an increase in the factor of micro-structure, g, can be suppressed, and no large strength reduction occurs in the SiC-based sintered product as long as the ideal relation $C_0 < < g$ is satisfied. In a currently used SiC-based sintered product, however, $C_0$ and g are normally such that $C_0 > g$, and the strength of the sintered product largely depends on the maximum defect size $C_0$.

In general, defects in a sintered product are caused by second phase component grains dispersed in the sintered body, impurities, or pores, and the maximum defect size $C_0$ depends on a combination of these defective factors. Especially in a dense sintered product obtained from a high-purity material, a ratio of a defective factor associated with second phase component grains dispersed in the sintered product is large. That is, as the grain size of the second phase component grains is increased, an associated defect size $C_1$ caused by the second phase component grains is increased, and the maximum defect size $C_0$ is increased accordingly, thereby reducing the strength of the sintered product. If the grain size of the second phase component grains is decreased, therefore, the associated defect size $C_1$ is decreased, and strength reduction in the sintered product caused by the second phase component can be suppressed. It is expected that the strength reduction can be suppressed as described above when the associated defect size $C_1$ is so small as compared with the factor of micro-structure, g, that the two factors can be considered to ideally satisfy $C_1 < < g$. The present inventors examined a relationship between the size of second phase component grains and strength reduction by changing the size of the second phase component grains and found that strength reduction abruptly occurred when a maximum grain size of the second phase component grains was increased to be larger than an average grain size of the matrix. When the maximum grain size of the second phase component grains is equal to or smaller than the average grain size of the matrix, therefore, it is assumed that the associated defect size $C_1$ is so small as to be considered to satisfy $C_1 < < g$ in the above equation (*) and strength reduction in the sintered body is suppressed.

When the second phase component grains consist of a carbide or boride, the carbide or boride grains exposed on the surface of a sintered product may be oxidized and removed to form recesses at high temperatures. If a maximum grain size of the second phase component grains of this type is larger than an average grain size of the matrix, these recesses function as breaking start points to extremely reduce fracture strength. By decreasing the maximum grain size of the second phase component grains to be equal to or smaller than the average grain size of the matrix, therefore, the fracture strength at high temperatures can be largely improved. In addition, since the pattern factor of maximum defect, Y, in the equation (*) can be decreased as the aspect ratio of the second phase component grains is decreased, a small aspect ratio is preferable in order to increase the fracture strength of.

In the above equation (*), the strength of the sintered product is improved as the factor of micro-structure, g, is decreased. In order to decrease the factor g in the SiC-based sintered product, the average grain size of the SiC matrix and the aspect ratio of the grains need only be decreased. In the present invention, therefore, the average grain size of the SiC matrix is preferably 5 $\mu$m or less, and more preferably, 2 $\mu$m or less, and the aspect ratio (length of the long axis/length of short axis) of the SiC sintered grains constituting the matrix is preferably 5 or less, and more preferably, 3 or less. As described above, however, it is a matter of course that in order to manufacture a fine sintered product having an average grain size of an SiC matrix grains of 2 $\mu$m or less, a second phase component having a small maximum grain size is used accordingly.

In a sintered product, as is apparent from the above equation (*), the fracture strength of is increased as the toughness value $K_{1c}$ is increased provided that the factor of micro-structure, g, the maximum defect size $C_0$, and the pattern factor, Y, are constant. That is, when strength reduction caused by abnormal grain growth, the associated defect size $C_1$, and the like is suppressed by the method as described above, the strength is increased by increasing the toughness value. In the present invention, TaC is particularly selected from transition metal carbides, and $NbB_2$, $VB_2$, and WB are particularly selected from transition metal borides for the following reason.

That is, TaC, $NbB_2$, $VB_2$, and WB are granularly dispersed as a second phase between or inside SiC grains in a sintered product. When cracks are formed in the sintered product, such a second phase refracts and deflects directions of these cracks to improve toughness of the sintered product. In addition, if a component of a second phase has a slightly larger thermal expansion coefficient than that of SiC of a first phase, a compression force is produced in the circumferential direction of a second phase peripheral portion of a sintered product, and a tensile stress is produced in its radial direction. In this case, the effect of refracting and deflecting the directions of cracks as described above is enhanced, and, therefore, it is preferred that the second phase has a larger thermal expansion coefficient than that of SiC. Values of a thermal expansion coefficient of the second phase component used in the present invention are $7.0 \times 10^{-6}/°$ C. for TaC and $9.8 \times 10^{-6}/°$ C. or more for $NbB_2$, $VB_2$, and WB at room temperature to 1,500° C., i.e., are proper values larger than $5.0 \times 10^{-6}/°$ C. of SiC. These transition metal carbide and borides are effective components for improving the toughness of a sintered product. In addition, such a component can be preferably used as the second phase component since no $CO_2$ is produced upon sintering unlike when an oxide is used as the second phase component. Furthermore, when TaC is used as the second phase component, TaC grains suppress a movement of an SiC grain boundary by pinning. Therefore, abnormal grain growth of SiC grains can be suppressed to decrease an average grain size.

In the present invention, when TaC is used as the second phase component, the content of TaC is 0.06 to 15 mol % in the sintered product main component. Note that in the present invention, the sintered product main component is the total of the second phase component dispersed in the sintered product and the SiC matrix. If the content of TaC exceeds 15 mol %, an oxidation resistance is decreased, and cracks may be formed in the SiC matrix due to volume expansion caused by oxidation of TaC to degrade the strength of the sintered product. If the content of TaC is too large, adjacent TaC grains may coalesce into one grain to increase a grain size upon sintering, thereby reducing the strength due to the associated defect size $C_1$ as described above. If the content of TaC is less than 0.06 mol %, a TaC addition effect may not be obtained. That is, when TaC is contained in an amount falling within the above range in the SiC matrix and a maximum grain size of TaC grains is equal to or smaller than an average grain size of the SiC matrix, high toughness and high strength can be achieved in the obtained sintered product.

In the present invention, when at least one of $NbB_2$, $VB_2$, and WB is used as the second phase component, the content of such a boride is 0.06 to 25 mol % in the sintered product main component. If the content of the boride exceeds 25 mol %, adjacent boride grains may coalesce into one grain to increase a grain size and an aspect ratio upon sintering, thereby reducing the strength due to the associated defect size $C_1$ as described above. The present inventors conducted a static air oxidation test at 1,500° C. —100H for a sintered product containing more than 25 mol % of NbB$_2$. As a result, a white glassy substance appeared on the surface of the black sintered product to further reduce the fracture strength. That is, if the content of NbB$_2$ exceeds 25 mol %, a large amount of NbB$_2$ grains are present on the surface of a sintered product and oxidized to form low-melting Nb$_2$O$_5$ (m.p. = 1,490° C.) and B$_2$O$_3$ (m.p. = 450° to 470° C.). These Nb$_2$O$_5$ and B$_2$O$_3$ flow to function as new breaking start points, thereby increasing the maximum defect size C$_0$. The present inventors conducted a similar test by using VB$_2$ as a boride and confirmed that a brown glassy substance appeared on the surface of a sintered product to cause a similar phenomenon. When WB was used as a boride, no change was found in the outer appearance of a sintered product. The weight of a test piece, however, was slightly reduced to degrade the fracture strength. This is because not only B$_2$O$_3$ flows as described above but also sublimable WO$_2$ is simultaneously produced and volatilized to form new breaking start points, thereby increasing the maximum defect size C$_0$. If the content of the boride is 25 mol % or less, only a small amount of boride grains is present on the surface of the sintered product, and a small amount of an oxide as described above is produced, thereby posing no problem. If the content of the boride is less than 0.06 mol %, a boride addition effect may not be obtained. That is, in the present invention, if the boride as described above is used as the second phase component, high toughness and high strength can be achieved in the obtained sintered product when the boride is contained in an amount falling within the above range in the SiC matrix and a maximum grain size of boride grains is equal to or smaller than an average grain size of the SiC matrix.

In the present invention, TaC grains and boride grains (at least one of NbB$_2$, VB$_2$, and WB) may be simultaneously present as second phase grains in a sintered product. In this case, however, a total amount of TaC and the boride must be 0.06 to 25 mol %.

The present inventors found that in order to improve the strength in an SiC-based sintered product containing these second phase components, pressureless sintering including normal pressure sintering and reduced pressure sintering, i.e. sintering without mechanical pressure, was more advantageous than sintering under pressure. In particular, strength at high temperatures obtained when a sintered product was manufactured by pressureless sintering was far superior to that of a sintered product manufactured by sintering under pressure. In order to find a reason for this phenomenon, the present inventors analyzed and examined, by using an electron microscope, micro-structures of broken surfaces of SiC-based sintered products obtained by both pressureless sintering and sintering under pressure. As a result, the following findings were obtained.

That is, when TaC was used as the second phase component, it was observed in an SiC-based sintered product manufactured by sintering under pressure that a grain boundary thin layer was formed at an interface between TaC grains and an SiC matrix and a grain boundary was broken in several portions. In an SiC-based sintered product manufactured by pressureless sintering, however, neither a grain boundary thin layer nor a grain boundary breaking were found. From these facts, it is assumed that a substance considered as tantalum silicide which is originally not produced from a view point of a free energy is produced at an interface between TaC grains and an SiC matrix when sintering under pressure is performed. Since tantalum silicide is inferior to SiC in strength, a grain boundary breaking mode is caused to reduce the strength of an SiC-based sintered product. In addition, it is assumed that since tantalum silicide has only a low oxidation resistance, tantalum silicide is oxidized at high temperatures to reduce, particularly, strength. When a boride is used as the second phase component, it was observed in an SiC-based sintered product manufactured by sintering under pressure that a net-like grain boundary layer was formed between SiC matrix grains and a grain boundary was broken in several portions. In an SiC-based sintered product manufactured by pressureless sintering, however, neither a grain boundary layer nor grain boundary breaking were found. From these facts, it is assumed that boride grains penetrate between SiC matrix grains to form a boride grain boundary layer therebetween when sintering under pressure is performed. Since this boride grain boundary layer is inferior to an SiC matrix in strength, a grain boundary breaking mode is caused in an SiC-based sintered product to reduce its strength. In addition, possibility of coalescence of adjacent boride grains upon sintering is increased by the grain boundary layer. Furthermore, it is assumed that when the grain boundary layer is formed, an amount of a boride exposed on the surface of a sintered product is increased, and the exposed portion is easily oxidized at high temperatures to reduce, particularly, the strength. In the present invention, therefore, toughness and fracture strength can be improved in an SiC-based pressureless sintered product containing second phase component grains having the grain size and the composition ratio as described above. By using pressureless sintering, a sintered product having a complicated shape can be realized.

In order to achieve high sintering density in an SiC-based pressureless sintered product of the present invention, a proper sintering assistant need only be used. For example, a known sintering assistant consisting of B and C components can be directly used. It is known that B and C components as a sintering assistant have the following functions. That is, in the initial stage of sintering, the B component is diffused on the surface of an SiC powder to reduce the surface energy of the SiC powder. As a result, evaporation, condensation, and surface diffusion of SiC are suppressed, and substance movement is accelerated, thereby increasing the density of the sintered product. In the later stage of sintering, the B component is present in the form of a solid solution in SiC to further accelerate sintering. The C component removes oxide films on the SiC powder and on the second phase component powder, including SiO$_2$, Ta$_2$O$_5$, Nb$_2$O$_5$, V$_2$O$_5$, WO$_2$, and B$_2$O$_3$ by reduction, thereby cleaning the powder surface. As a result, atomic diffusion between grains is accelerated to increase the density of the sintered product.

The density of the SiC-based pressureless sintered product of the present invention is increased by using such a sintering assistant. As described above, the B component is present in the form of a solid solution in SiC to increase the density and therefore preferably remains in a sintered product. The content of the B component in terms of B atoms is preferably 0.06 to 5.0 atomic %, more preferably, 0.06 to 1.0 atomic %, and most preferably, 0.06 to 0.6 atomic % for the following reason. That is, if an amount of the B component is too large, precipitation of B$_4$C in an SiC grain boundary of a sintered product is increased. Since precipitated B$_4$C is a brittle component and therefore may reduce the strength of the sintered product, a large amount of precipitation is not preferred. In addition, since a thermal expansion coefficient of $B_4C$ at room temperature to 2,000° C. is $4.5 \times 10^{-6}$/° C., i.e., smaller than that of SiC, the toughness of the sintered product is not much improved. The content of the B component is, therefore, preferably 5.0 atomic % or less, and more preferably, 1.0 atomic % or less, and most preferably, 0.6 atomic % or less. Especially when the second phase component is TaC, TaC grains in the sintered product are decomposed by the B component to abruptly increase an amount of $TaB_2$ to be produced if the content of the B component exceeds 0.6 atomic %. Unlike $B_4C$, $TaB_2$ has a thermal expansion coefficient at room temperature to 2,000° C. of $6.2 \times 10^{-6}$/° C., i.e., larger than that of SiC and therefore has an effect of improving the toughness of the sintered product. Since, however, a difference between thermal expansion coefficients of $TaB_2$ and SiC is smaller than that between TaC and SiC, a stress produced around grains is small. Therefore, the same toughness improving effect as that of TaC cannot be obtained by $TaB_2$. For this reason, the content of the B component is most preferably 0.6 atomic %. If the content of the B component must be increased to exceed 0.6 atomic % for some reasons, the content (atomic %) of the B component is preferably not larger than the content (mol %) of TaC in order to suppress an amount of $TaB_2$ to be produced. To the contrary, if the content of the B component is less than 0.06 atomic %, the effect of increasing the density of the sintered product obtained by the B component present in the form of a solid solution in SiC cannot be obtained. Therefore, the sintered product becomes a porous product.

After reducing oxygen contained in a starting material of a sintered product main component upon sintering, the excessive C component suppresses abnormal grain growth of the SiC matrix If, however, the C component remains in the sintered product in a large amount, an oxidation resistance at high temperatures may be reduced. Therefore, the content of the C component in the sintered product is preferably 5.0 atomic % or less. Oxygen may remain in the sintered product regardless of the effect of the C component described above. The content of this residual oxygen is preferably 0.2 atomic % or less with respect to the sintered product main component. This is because if an amount of oxygen remaining in the sintered product is large, $SiO_2$ may be formed in the sintered product to reduce its chemical resistance.

The density of the sintered product can be increased by performing sintering by using the sintering assistance as described above. The sintering density of the obtained SiC-based non-pressed sintered product, however, is preferably 90% to 95% of the theoretical density for the following reason. That is, if the sintering density is low to form open pores extending through the sintered product, second phase component grains dispersed in the sintered product are easily oxidized to reduce the oxidation resistance. In addition, if not open pores but a large number of large closed pores are present in the sintered product, these closed pores function as breaking start points to reduce the strength of the sintered product.

A method of manufacturing the SiC-based pressureless sintered product of the present invention will be described in detail below.

As an SiC powder as a starting material, any of $\alpha$-SiC of an irregular system, $\beta$-SiC of a regular system, and a mixture thereof can be used. In order to obtain a dense sintered product, an average grain size is preferably 1.5 $\mu$m or less, and more preferably, 1.0 $\mu$m or less, and a specific surface area is preferably 5 m$^2$/g or more, and more preferably, 10 m$^2$/g or more. In addition, smaller amounts of impurities such as free Si, free $SiO_2$, free C, Fe, Al, Ca, or Mg normally contained in the SiC powder are preferred.

In order to reduce a maximum grain size of the second phase component powder as a starting material in the obtained sintered product to be equal to or smaller than an average grain size of the SiC matrix, large grains must be removed from the second phase component powder to obtain a fine powder having a narrow grain size distribution. In addition, a powder having a proper maximum grain size must be selected as the second phase component powder in consideration of manufacturing conditions of the SiC-based pressureless sintered product. Normally, in a SiC-based pressureless sintered product, the average grain size of the SiC matrix can be reduced to be about 5 $\mu$m provided that control is precisely performed by using a proper sintering assistant. Therefore, the maximum grain size of the second phase component powder is preferably 5 $\mu$m or less, and more preferably, 3 $\mu$m or less. For this purpose, a powder having an average grain size of 2 $\mu$m or less, and preferably, 1.5 $\mu$m or less is normally used as the second phase component powder. In order to manufacture an especially fine sintered product having an average grain size of the SiC matrix of 2 $\mu$m or less, however, it is a matter of course that a powder having a maximum grain size of 2 $\mu$m or less is used as the second phase component powder accordingly. If the content of second phase component grains exceeds 20 mol %, a possibility of flattening or coalescence of the grains is increased. In this case, therefore, a correspondingly fine powder is preferably used. In order to obtain an SiC-based pressureless sintered product having high strength, an aspect ratio of the second phase component grains is preferably small. Therefore, a second phase component powder having an aspect ratio of 5 or less, and preferably, 3 or less is preferably used. In addition, smaller amounts of impurities such as $Ta_2O_5$, $Nb_2O_5$, $V_2O_5$, $WO_2$, free C, or Fe contained in the second phase component powder are preferred. An allowable content of NbC having chemical properties similar to those of TaC, however, is up to 10 mol % with respect to TaC.

As the B component of the sintering assistant, a fine powder such as amorphous B, $B_4C$, BN, or $B_2O_3$ or liquid $B_{10}H_{12}C_2$ can be used as a starting material. Although a C powder, amorphous C, or the like can be used as the C component, a substance such as a phenolic resin represented by, e.g., resol or novolak which is decomposed to produce free C upon heating is preferably used since uniform dispersion is easily obtained. As described above, such a C component reduces and removes oxygen contained as a surface oxide film in SiC and the second phase component in the form of CO and $CO_2$ upon sintering performed in a non-oxidizing atmosphere. The content of the C component is preferably 1.5 to 3.0 times (weight ratio) that of oxygen in the above impurities.

The starting materials can be prepared by long-time mixing by using a wet or dry ball mill. Since, however, a specific gravity difference between SiC (3.217 g/cc) and TaC (14.407 g/cc), $NbB_2$ (6.924 g/cc), $VB_2$ (5.059 g/cc), and WB (15.734 g/cc) is large and SiC is therefore easily separated from the other components, a high-concentration slurry is preferably formed. A large amount of materials can be treated by spray dry upon drying and granulation. A casting method from a slurry, an extrusion method, and an injection method can be used as a molding method. If the shape of a desired sintered product is simple, a spray dry powder need only be molded by using metal molds, and CIP (Cold Isostatic Press) molding can be performed as needed. In order to use a binder for improving molding properties, an optimal amount of, e.g., ethyleneglycol, paraffin, or a suitable resin need only be mixed and dissolved in the slurry. The molded product is gradually heated in a non-oxidizing atmosphere up to 700° to 900° C. to decompose and release the resin component such as the binder (a degreasing step) to form a degreased product. In order to improve heating uniformity upon sintering of the degreased product, the degreased product is put in a carbon vessel and set in a vacuum or atmospheric sintering furnace with a carbon heater.

Since the surface oxide film on SiC and the second phase component powder or the contained impurities such as free Si is or are gasified and released upon heating, the temperature must be particularly gradually increased within a range of 1,200° to 1,450° C. or held during heating until a reduced vacuum degree caused by gas releasing is recovered. This is because if the temperature is rapidly increased, not only a sample cracks or expands due to gas releasing described above, but also the amounts of oxygen and impurities in the sintered produce are increased and abnormal grain growth of the SiC matrix occurs. Finally, the density of the resultant product is increased in a vacuum or an inert gas atmosphere for one to three hours while the temperature is maintained within a range of 1,800 to 2,200° C. The inert gas atmosphere at a sintering temperature is preferred since decomposition of SiC is more or less suppressed. Therefore, a gas atmosphere of, e.g., Ar, He, or Ne at an atmospheric pressure is normally used. The sintering density and a micro-structure are more or less changed by increasing/decreasing the temperature between 1,800° and 2,200° C. in two to three steps and changing a supply timing of an Ar gas into the furnace during the density increasing (densifying) process or due to a space factor of the degreased product in the carbon vessel. For this reason, programs at 1,800° to 2,200° C. must be checked to be optimal for an individual sintering furnace to be used. Sintering at high temperatures exceeding 2,200° C. is not preferred since not only abnormal grain growth of the SiC matrix occurs but also diffusion of the second phase component grains is so active to increase the grain size of the grains.

After the high temperature is held for a predetermined time period as described above, the resultant product is preferably cooled as rapidly as possible. If the temperature is extremely gradually decreased over several days, a stress formed in the SiC matrix around the second phase component grains is reduced to reduce a strain storage amount, thereby reducing the fracture toughness value. The temperature is, therefore, preferably decreased to at least about 1,500° C. within one hour.

The density of the sintered product manufactured as described above can be further increased by performing an HIP (Hot Isostatic Press) in an Ar atmosphere at about 2,000° C. and $10^9$ Pa, after sintering. In this case, unlike when an SiC-based sintered product is manufactured by sintering under pressure, almost no grain boundary layer nor grain boundary breaking is found between the SiC matrix and the grains and at an interface between the SiC matrix and the second phase component. As a result, an SiC-based pressureless sintered product having high toughness and high fracture strength can be obtained.

The present invention will be described in detail below by way of its examples.

EXAMPLE 1

144.3 g of a commercially available α-SiC powder (α-SiC, UF-15 available from LONZA CO.) (oxygen content =1.28 wt %) having an average grain size of 0.8 μm and a specific surface area of 15 m²/g and 77.2 g of a commercially available TaC powder (available from NIHON SHINKINZOKU K.K.) (oxygen content=0.13 wt %) having an average grain size of 0.5 μm and a maximum grain size of 3.0 μm were mixed to prepare a sintered product main component consisting of 90 mol % of SiC and 10 mol % of TaC. 0.6 g of an amorphous B powder corresponding to about 0.6 atm % of the sintered product main component and 7.4 g (C content=4.4 g) of a novolak resin as a C component were added as a sintering assistant to the sintered product main component. The resultant mixture and 20 cc of ethyleneglycol as a binder were added to 200 cc of acetone as a solvent to form a slurry, and the slurry was mixed in a pot mill for 72 hours. The acetone was dried out at room temperature and the mixture was filtered through a filter of 60 mesh for granulation. The obtained grains were molded into a 33×43×6-mm plate by using metal molds and subjected to CIP (rubber press) at 3 ton/cm². The resultant plate was heated up to 800° C. in a nitrogen atmosphere over a half day to decompose and release the binder and the novolak resin, thereby obtaining a degreased product. The degreased product put in a carbon vessel was heated up to about 1,000° C. in a vacuum sintering furnace, and the temperature was increased to 1,300° C. at a rate of 250° C./H. After the temperature was held for about one hour to wait for recovery of reduction in vacuum degree caused by gas releasing, it was increased to 1,450° C. at a rate of 125° C./H. After the temperature was further increased to 2,000° C. at a rate of 1,000° C./H, Ar gas was supplied to the furnace, and the temperature was held at normal pressure for two hours, thereby obtaining an SiC-based pressureless sintered product according to the present invention having a density of 4.15 g/cc. In the obtained sintered product, the maximum grain size of TaC grains was held at 3.0 μm, and the SiC matrix was so fine as to have an average grain size of 5.0 μm which is about ½ a normal average grain size of about 10 μm of the matrix. Since the addition amount of the B component of the sintering assistant was as small as 0.6 atomic % and the amount of produced TaB₂ was as small as 0.3 mol % or less, a sintering density was calculated without considering these values. As a result, the calculated sintering density was 93% of the theoretical density.

Anti-bending test pieces (3×4×33 mm) according to JIS standards were cut out from the obtained sintered product, and a strength test was conducted by 3-point bending. As a result, strength values of the test pieces were satisfactory: 93 kg/mm² at room temperature and 95 kg/mm² at 1,500° C., and 93 kg/mm² at room temperature even after a static air oxidation test was conducted at 1,500° C. for 100 hours. In addition, a toughness value was calculated in accordance with an indentation microfracture method by using an experimental equation by Niihara et al. As a result, the calculated toughness value was as high as 5.7 MPa$\sqrt{m}$. An oxidation increase amount in the 1,500° C.—100H static air oxidation test was as small as 0.2 mg/cm$^2$. That is, the obtained sintered product was also superior in oxidation resistance. These measurement results are summarized in Table 1 to be presented later.

EXAMPLES 2-5

TaC powders having average grain sizes and maximum grain sizes as shown in Table 1 were mixed at composition ratios as shown in Table 1 with α-SiC powders similar to that used in Example 1, thereby preparing sintered product main components. Following the same procedures as in Example 1, SiC-based pressureless sintered products having a B component in amounts as shown in Table 1 were manufactured. In each of the manufactured sintered products, a maximum grain size of TaC grains was substantially held at that of a starting material, and an SiC matrix was so fine as to have an average grain size of 5.0 to 4.7 μm. In addition, as shown in Table 1, a sintering density was 90% or more of the theoretical density. Measurement results obtained by analyzing this sintered product following the same procedures as in Example 1 are also shown in Table 1. As shown in Table 1, each of the sintered products obtained in Example 2 to 5 had a toughness value of 3.0 MPa$\sqrt{m}$ or more and a strength at room temperature of 55 kg/mm$^2$. Even after a 1,500° C.—100H static air oxidation test was conducted, these characteristics were substantially not degraded, and an oxidation increase amount was as small as 0.6 mg/cm$^2$.

EXAMPLE 6

The SiC-based pressureless sintered product obtained in Example 3 was further subjected to an HIP in an Ar atmosphere at 2,000° C. and 10$^9$ Pa. As a result, a sintering density was increased to 95% of the theoretical density. Note that almost no change was found in grain sizes of TaC grains and an SiC matrix during the HIP. The sintered product was analyzed following the same procedures as in Example 1. As a result, the sintered product had a satisfactory toughness value of 4.9 MPa$\sqrt{m}$ and a satisfactory strength at room temperature of 92 kg/mm$^2$. Even after a 1,500° C.—100H static air oxidation test was conducted, the sintered product had a satisfactory strength of 90 kg/mm$^2$ and a satisfactory oxidation increase amount of 0.1 mg/mm$^2$.

COMPARATIVE EXAMPLES 1-3

TaC powders having average grain sizes and maximum grain sizes as shown in Table 1 were mixed at composition ratios as shown in Table 1 with α-SiC powders similar to that used in Example 1, thereby preparing sintered product main components. Following the same procedures as in Example 1, SiC-based non-pressed sintered products having a B component in amounts shown in Table 1 were manufactured. Measurement results obtained by analyzing the obtained sintered products following the same procedures as in Example 1 are summarized in Table 1. As shown in Table 1, each of the sintered products of Comparative Examples 1 and 2 had only a low strength at room temperature of less than 55 kg/mm$^2$ and a low toughness value of 3.0 MPa$\sqrt{m}$, i.e., the TaC addition effect was not obtained. In the sintered produce of Comparative Example 3, the characteristics were degraded such that strength was decreased to be 35 kg/mm$^2$ and an oxidation increase amount was as large as 0.8 mg/cm$^2$ after a 1,500° C.—100H static air oxidation test was conducted. That is, this sintered product was inferior in oxidation resistance.

COMPARATIVE EXAMPLE 4

By using starting materials similar to those used in Example 4, a sintered produce main component was prepared following the same procedures as in Example 4. Thereafter, an SiC-based sintered product having the same B component content as that of Example 4 was manufactured by hot pressing. Measurement results obtained by analyzing the obtained sintered product following the same procedures as in Example 1 are summarized in Table 1. As shown in Table 1, the sintered product of this comparative example had only a low strength at room temperature of 61 kg/mm$^2$ and a low toughness value of 3.9 MPa$\sqrt{m}$. After a 1,500° C.—100H static air oxidation test was conducted, the strength of the sintered product was conspicuously reduced to be 47 kg/mm$^2$.

COMPARATIVE EXAMPLE 5

An SiC-based non-pressed sintered product was manufactured following the same procedures as in Example 1 except that a TaC powder having an average grain size of 3.5 μm and a maximum grain size of 10.0 μm was used. In the obtained sintered product, an average grain size of an SiC matrix was 5.3 μm i.e., the maximum grain size of TaC grains was larger than the average grain size of the SiC matrix. Measurement results obtained by analyzing the sintered product following the same procedures as in Example 1 are summarized in Table 1. As shown in Table 1, the sintered product of this comparative example was inferior to that of Example 1 in strength. In addition, after a 1,500° C.—100H static air oxidation test was conducted, the strength of this sintered product was conspicuously reduced to be 49 kg/mm$^2$.

EXAMPLE 7

A sintered product main component was prepared following the same procedures as in Example 5 except that a TaC powder having a maximum grain size of 4.3 μm and containing 4.7 mol % of NbC was used as a starting material. Thereafter, an SiC-based non-pressed sintered product was manufactured following the same procedures as in Example 5. In the obtained sintered product, a maximum grain size of TaC grains was 4.4 μm, and an SiC matrix was so fine as to have an average grain size of 4.6 μm. In addition, a sintering density was increased to be 92% of the theoretical density. Measurement results obtained by analyzing the sintered product following the same procedure as in Example 1 are summarized in Table 1. As shown in Table 1, the sintered product of this example had a satisfactory strength of 95 kg/mm$^2$, and a satisfactory toughness value of 5.8 MPa$\sqrt{m}$. Even after a 1,500° C.—100H static air oxidation test was conducted, the sintered product had a high strength of 89 kg/mm$^2$ and a small oxidation increase amount of 0.7 mg/cm$^2$.

COMPARATIVE EXAMPLE 6

A sintered product main component was prepared following the same procedures as in Example 5 except that a TaC powder having a maximum grain size of 4.2

μm and containing 50 mol % of NbC was used as a starting material. Thereafter, an SiC-based pressureless sintered product was manufactured following the same procedures as in Example 5. Measurement results obtained by analyzing the obtained sintered product following the same procedures as in Example 1 are summarized in Table 1. As shown in Table 1, the sintered product of this comparative example had only a low density of 89%, a toughness value of 4.1 MPa$\sqrt{m}$, and a strength at room temperature of 51 kg/mm$^2$. After a 1,500° C.—100H static air oxidation test was conducted, the strength of the sintered product was 37 kg/mm$^2$, and an oxidation increase amount was 1.5 mg/cm$^2$. That is, no satisfactory characteristics could be obtained.

equation by Niihara et al. As a result, the calculated toughness value was as high as 3.8 MPa$\sqrt{m}$. An oxidation increase amount in the 1,500° C.—100H static air oxidation test was as small as 0.26 mg/cm$^2$. That is, the sintered product was also superior in oxidation resistance. These measurement results are summarized in Table 2 to be presented later.

EXAMPLE 9

17.4 g of a commercially available VB$_2$ powder (available from NIHON SHINKINZOKU, K.K.) (oxygen content =0.78 wt %) having an average grain size of 1.25 μm and a maximum grain size of 2.9 μm were mixed with 150.2 g of an α-SiC powder similar to that

TABLE 1

| | Starting Material | | | | | | | Sintered Product | | | | |
|---|---|---|---|---|---|---|---|---|---|---|---|---|
| | SiC Av. Size (μm) | TaC Amount (mol %) | TaC Av. Size (μm) | TaC Max. Size (μm) | SiC Av. Size (μm) | TaC Max. Size (μm) | B Comp. Content (atm %) | Strength at room temp. (kg/mm$^2$) | Strength after oxidation (kg/mm$^2$) | Toughness (MPa$\sqrt{m}$) | Increase by Oxidation (mg/cm$^2$) | Sintering Density / Theoretical Density (%) |
| Ex. | | | | | | | | | | | | |
| 1 | 0.8 | 10.0 | 1.5 | 3.0 | 5.0 | 3.0 | 0.6 | 95 | 93 | 5.7 | 0.2 | 93 |
| 2 | 0.8 | 0.06 | 2.0 | 4.5 | 5.0 | 4.5 | 0.06 | 55 | 55 | 3.4 | 0.01 | 90 |
| 3 | 0.8 | 0.6 | 2.0 | 4.5 | 5.0 | 4.5 | 0.6 | 60 | 59 | 4.0 | 0.02 | 91 |
| 4 | 0.8 | 6.0 | 2.0 | 4.5 | 4.9 | 4.5 | 0.6 | 90 | 88 | 5.0 | 0.2 | 92 |
| 5 | 0.8 | 15.0 | 2.0 | 4.5 | 4.7 | 4.6 | 0.6 | 96 | 90 | 5.8 | 0.6 | 93 |
| 6 | 0.8 | 6.0 | 2.0 | 4.5 | 5.0 | 4.5 | 0.6 | 92 | 90 | 4.9 | 0.1 | 95 |
| 7 | 0.8 | 15.0 | 2.0 | 4.3 | 4.6 | 4.4 | 0.6 | 95 | 89 | 5.8 | 0.7 | 92 |
| Com. Ex. | | | | | | | | | | | | |
| 1 | 0.8 | 0 | — | — | 7.0 | — | 0.6 | 52 | 52 | 2.5 | 0.003 | 98 |
| 2 | 0.8 | 0.03 | 2.0 | 4.5 | 6.6 | 4.5 | 0.06 | 50 | 50 | 2.6 | 0.005 | 98 |
| 3 | 0.8 | 20.0 | 2.0 | 4.5 | 4.5 | 5.5 | 0.6 | 97 | 35 | 6.3 | 0.8 | 95 |
| 4 | 0.8 | 6.0 | 2.0 | 4.5 | 4.6 | 4.5 | 0.6 | 61 | 47 | 3.9 | 0.1 | 96 |
| 5 | 0.8 | 10.0 | 3.5 | 10.0 | 5.3 | 10.0 | 0.6 | 87 | 49 | 5.6 | 0.4 | 92 |
| 6 | 0.8 | 15.0 | 2.0 | 4.2 | 4.4 | 4.3 | 0.6 | 51 | 37 | 4.1 | 1.5 | 89 |

EXAMPLE 8

27.5 g of a commercially available NbB$_2$ powder (available from NIHON SHINKINZOKU K.K.) (oxygen content =0.78 wt %) having an average grain size of 0.98 μm and a maximum grain size of 3.0 μm were mixed with 150.8 g of an α-SiC powder similar to that used in Example 1, thereby preparing a sintered product main component consisting of 94 mol % of SiC and 6 mol % of NbB$_2$. An SiC-based pressureless sintered product according to the present invention having a density of 3.39 g/cc was manufactured following the same procedures as in Example 1 except that an addition amount of a novolak resin was 8.2 g (C content=4.8 g). In the obtained sintered product, a maximum grain size of NbB$_2$ grains was held at 3.0 μm, and an SiC matrix was so fine as to have an average grain size of 4.6 μm which was about ½ a normal average grain size of about 10 μm. Since the addition amount of the B component of a sintering assistant was as small as 0.6 atomic %, a sintering density was calculated without considering this value. As a result, the calculated sintering density was 99% of the theoretical density.

Anti-bending test pieces (3×4×33 mm) according to JIS standards were cut out from the obtained sintered product to conduct a strength test by 3-point bending. As a result, the sintered product had satisfactory strength values of 71 kg/mm$^2$ at room temperature and 69 kg/mm$^2$ at 1,500° C. Even after a static air oxidation test was conducted at 1,500° C. for 100 hours, the sintered product still had a satisfactory strength value of 67 kg/mm$^2$ at room temperature. In addition, a toughness value was calculated in accordance with an indentation microfracture method by using an experimental used in Example 1, thereby preparing a sintered product main component consisting of 94 mol % of SiC and 6 mol % of VB$_2$. An SiC-based pressureless sintered product according to the present invention having a density of 3.26 g/cc was manufactured following the same procedures as in Example 1 except that an addition amount of a novolak resin was 8.1 g (C content=4.8 g). In the obtained sintered product, a maximum grain size of VB$_2$ grains was held at 2.9 μm, and an SiC matrix was so fin have an average grain size of 4.7 μm which was about ½ a normal average grain size of about 10 μm. Since the addition amount of the B component of a sintering assistant was as small as 0.6 atomic %, a sintering density was calculated without considering this value. As a result, the calculated sintering density was 98% of the theoretical density.

Anti-bending test pieces (3×4×33 mm) according to JIS standards were cut out from the obtained sintered product to conduct a strength test by 3-point bending. As a result, the sintered product had satisfactory strength values of 70 kg/mm$^2$ at room temperature and 68 kg/mm$^2$ at 1,500° C. Even after a static air oxidation test was conducted at 1,500° C. for 100 hours, the sintered product still had a satisfactory strength value of 67 kg/mm$^2$ at room temperature. In addition, a toughness value was calculated in accordance with an indentation microfracture method by using an experimental equation by Niihara et al. As a result, the calculated toughness value was as high as 3.8 MPa$\sqrt{m}$. An oxidation increase amount in the 1,500° C.—100H static air oxidation test was as small as 0.16 mg/cm$^2$. That is, the sintered product was also superior in oxidation resis-

EXAMPLE 10

46.72 g of a commercially available WB powder (available from NIHON SHINKINZOKU K.K.) (oxygen content = 0.36 wt %) having an average grain size of 1.50 μm and a maximum grain size of 3.2 μm were mixed with 150.2 g of an α-SiC powder similar to that used in Example 1, thereby preparing a sintered product main component consisting of 94 mol % of SiC and 6 mol % of WB. An SiC-based pressureless sintered product according to the present invention having a density of 3.68 g/cc was manufactured following the same procedures as in Example 1 except that an addition amount of a novolak resin was 8.0 g (C content = 4.7 g). In the obtained sintered product, a maximum grain size of WB grains was held at 3.2 μm, and an SiC matrix was so fine as to have an average grain size of 4.5 μm which was about ½ a normal average grain size of about 10 μm. Since the addition amount of the B component of a sintering assistant was as small as 0.6 atomic %, a sintering density was calculated without considering this value. As a result, the calculated sintering density was 96% of the theoretical density.

Anti-bending test pieces (3×4×33 mm) according to JIS standards were cut out from the obtained sintered product to conduct a strength test by 3-point bending. As a result, the sintered product had satisfactory strength values of 68 kg/mm² at room temperature and 67 kg/mm² at 1,500° C. Even after static air oxidation test was conducted at 1,500° C. for 100 hours, the sintered product still had a satisfactory strength value of 66 kg/mm² at room temperature. In addition, a toughness value was calculated in accordance with an indentation microfracture method by using an experimental equation by Niihara et al. As a result, the calculated toughness value was as high as 3.7 MPa$\sqrt{m}$. An oxidation increase amount in the 1,500° C.—100H static air oxidation test was as small as 0.11 mg/cm². That is, the sintered product was also superior in oxidation resistance. These measurement results are summarized in Table 2 to be presented later.

EXAMPLES 11-26

Boride powders having maximum grain sizes as shown in Table 2 were mixed at composition ratios as shown in Table 2 in α-SiC powders similar to that used in Example 1, thereby preparing sintered product main components. SiC-based pressureless sintered products according to the present invention were manufactured following the same procedures as in Example 1. In each of the obtained sintered products having a composition ratio of boride grains of 12 mol % or less, the maximum grain size of the boride grains was substantially held at the value of the starting material, and an SiC matrix was so fine as to have an average grain size of 4.0 to 4.9 μm. In each of the sintered products having a composition ratio of boride grains of 24 mol %, although the grain size of the boride grains was increased, a maximum grain size of the grains was equal to or smaller than an average grain size of the SiC matrix. In addition, a sintering density was 95% or more of a theoretical density as shown in Table 2. Measurement results obtained by analyzing the sintered products following the same procedures as in Example 1 are summarized in Table 2. As shown in Table 2, each of the sintered products obtained by Examples 11 to 26 had a toughness value of 3.0 MPa$\sqrt{m}$ or more and a strength at room temperature of 55 kg/mm² or more. Even after a 1,500° C.—100H static air oxidation test was conducted, almost no degradation was found in characteristics, and an oxidation increase amount was as small as less than 0.5 mg/cm².

EXAMPLES 27 & 28

The SiC-based pressureless sintered products obtained in Examples 8 and 9 were further subjected to an HIP in an Ar atmosphere at 2,000° C. and 10⁹ Pa. As a result, a high density of 99% or more of the theoretical density was obtained in each sintered product. Note that almost no change was found in grain sizes of boride grains and an SiC matrix. These sintered products were analyzed following the same procedures as in Example 1. As a result, as shown in Table 2, each sintered product had a toughness value of 3.9 MPa$\sqrt{m}$ and a strength at room temperature of 75 kg/mm² or more. Even after a 1,500° C.—100H static air oxidation test was conducted, each sintered product still had a satisfactory strength of 70 kg/mm² or more, and an oxidation increase amount was as low as less than 0.25 mg/cm².

COMPARATIVE EXAMPLES 7-13

Boride powders having maximum grain sizes as shown in Table 2 were mixed at composition ratios as shown in Table 2 with α-SiC powders similar to that used in Example 1, thereby preparing sintered product main components. An SiC-based pressureless sintered product were manufactured following the same procedures as in Example 1. Measurement results obtained by analyzing the obtained sintered products following the same procedures as in Example 1 are summarized in Table 2. As shown in Table 2, in each of the sintered products of Comparative Examples 7, 8, 10, and 12, both a strength at room temperature and a toughness value were as low as less than 55 kg/mm² and less than 3.0 MPa$\sqrt{m}$, respectively. That is, no boride addition effect was obtained. In each of the sintered products of Comparative Examples 9, 11, and 13, characteristics were degraded such that a strength was reduced to be less than 55 kg/mm² and an oxidation increase amount was large after a 1,500° C.—100H static air oxidation test was conducted. That is, it was confirmed that these sintered products were poor in oxidation resistance.

COMPARATIVE EXAMPLES 14 & 15

Sintered product main components were prepare, following the same procedures as in Example 1 by using starting materials similar to those used in Examples 8 and 13 and were used to manufacture SiC-based sintered products by hot pressing. Measurement results obtained by analyzing the obtained sintered products following the same procedures as in Example 1 are summarized in Table 2. As shown in Table 2, in the sintered product of Comparative Example 14, a strength was as low as 67 kg/mm² at room temperature and conspicuously reduced to be 47 kg/mm² after a 1,500° C.—100H static air oxidation test was conducted. In the sintered product of Comparative Example 15, a maximum grain size of boride grains was larger than an average grain size of the SiC matrix After a 1,500° C.—100H static air oxidation test was conducted, a strength of this sintered product was reduced to be 36 kg/mm², and an oxidation increase amount was as large as 1.50 mg/cm². That is, this sintered product was poor in oxidation resistance.

COMPARATIVE EXAMPLE 16

An SiC-based pressureless sintered product was manufactured following the same procedures as in Example 14 except that an NbB$_2$ powder which had a maximum grain size of 4.0 μm and from which coarse grains were not removed before it was used was used as boride grains. In the obtained sintered product, an average grain size of the SiC matrix was 4.3 μm, and a maximum grain size of NbB$_2$ grains was 9.0 μm, i.e., the maximum grain size of the NbB$_2$ grains was larger than the average grain size of the SiC matrix. Measurement results obtained by analyzing this sintered product following the same procedures as in Example 1 are summarized in Table 2. As shown in Table 2, the sintered product of this comparative example was inferior to that of Example 14 in strength. In addition, after a 1,500° C.—100H static air oxidation test was conducted, the strength was conspicuously reduced to be 39 kg/mm².

COMPARATIVE EXAMPLE 17

An SiC-based pressureless sintered product was manufactured following the same procedures as in Example 17 except that a VB$_2$ powder which had a maximum grain size of 7.6 μm and from which coarse grains were not removed before it was used was used as boride grains. In the obtained sintered product, an average grain size of the SiC matrix was 4.7 μm, i.e., the maximum grain size of VB$_2$ grains was larger than the average grain size of the SiC matrix. Measurement results obtained by analyzing this sintered product following the same procedures as in Example 1 are summarized in Table 2. As shown in Table 2, the sintered product of this comparative example was inferior to that of Example 17 in strength. In addition, after a 1,500° C.—100H static air oxidation test was conducted, the strength was conspicuously reduced to be 49 kg/mm².

COMPARATIVE EXAMPLE 18

An SiC-based pressureless sintered product was manufactured following the same procedures as in Example 22 except that a WB powder which had a maximum grain size of 3.9 μm and from which coarse grains were not removed before it was used was used as boride grains. In the obtained sintered product, an average grain size of the SiC matrix was 4.3 μm, i.e., the maximum grain size of VB$_2$ grains was larger than the average grain size of the SiC matrix. Measurement results obtained by analyzing this sintered product following the same procedures as in Example 1 are summarized in Table 2. As shown in Table 2, the sintered product of this comparative example was inferior to that of Example 22 in strength. In addition, after a 1,500° C.—100H static air oxidation test was conducted, the strength was conspicuously reduced to be 53 kg/mm².

TABLE 2

| | Starting Material Boride | | | | | | | Sintered Product | | | | |
|---|---|---|---|---|---|---|---|---|---|---|---|---|
| | SiC | NbB₂ | | VB₂ | | WB | | SiC | Boride | Strength at room temp. | Strength after Oxidation | Toughness | Increase by Oxidation | Sintering Dens. |
| | Av. Size (μm) | Amount (mol %) | Max. Size (μm) | Amount (mol %) | Max. Size (μm) | Amount (mol %) | Max. Size (μm) | Av. Size (μm) | Max. Size (μm) | (kg/mm²) | (kg/mm²) | (MPa√m) | (mg/cm²) | Theor. Dens. (%) |
| Ex. | | | | | | | | | | | | | | |
| 8  | 0.8 | 6.0  | 3.0 | 0    | —   | 0    | —   | 4.6 | 3.0 | 71 | 67 | 3.8 | 0.26  | 99  |
| 9  | 0.8 | 0    | —   | 6.0  | 2.9 | 0    | —   | 4.7 | 2.9 | 70 | 67 | 3.8 | 0.16  | 98  |
| 10 | 0.8 | 0    | —   | 0    | —   | 6.0  | 3.2 | 4.5 | 3.2 | 68 | 66 | 3.7 | −0.11 | 96  |
| 11 | 0.8 | 0.06 | 3.0 | 0    | —   | 0    | —   | 4.9 | 3.0 | 60 | 59 | 3.2 | 0.10  | 98  |
| 12 | 0.8 | 0.6  | 3.0 | 0    | —   | 0    | —   | 4.8 | 3.0 | 64 | 62 | 3.4 | 0.16  | 98  |
| 13 | 0.8 | 12   | 3.0 | 0    | —   | 0    | —   | 4.5 | 3.0 | 84 | 80 | 3.4 | 0.32  | 99  |
| 14 | 0.8 | 24   | 1.9 | 0    | —   | 0    | —   | 4.0 | 3.7 | 90 | 85 | 4.5 | 0.40  | 98  |
| 15 | 0.8 | 0    | —   | 0.06 | 2.9 | 0    | —   | 4.8 | 2.9 | 59 | 58 | 6.0 | 0.09  | 98  |
| 16 | 0.8 | 0    | —   | 0.6  | 2.9 | 0    | —   | 4.7 | 2.9 | 63 | 61 | 3.2 | 0.12  | 98  |
| 17 | 0.8 | 0    | —   | 12   | 2.9 | 0    | —   | 4.6 | 2.9 | 86 | 81 | 3.4 | 0.18  | 97  |
| 18 | 0.8 | 0    | —   | 24   | 1.9 | 0    | —   | 4.4 | 3.5 | 89 | 80 | 4.6 | 0.45  | 97  |
| 19 | 0.8 | 0    | —   | 0    | —   | 0.06 | 3.2 | 4.9 | 3.2 | 60 | 59 | 6.2 | −0.04 | 97  |
| 20 | 0.8 | 0    | —   | 0    | —   | 0.6  | 3.2 | 4.7 | 3.2 | 63 | 62 | 3.2 | −0.07 | 97  |
| 21 | 0.8 | 0    | —   | 0    | —   | 12   | 3.2 | 4.2 | 3.2 | 74 | 70 | 3.4 | −0.18 | 97  |
| 22 | 0.8 | 0    | —   | 0    | —   | 24   | 2.0 | 4.0 | 3.8 | 82 | 77 | 4.1 | −0.26 | 97  |
| 23 | 0.8 | 6.0  | 3.0 | 6.0  | 2.9 | 0    | —   | 4.6 | 3.0 | 85 | 82 | 4.9 | 0.28  | 98  |
| 24 | 0.8 | 6.0  | 3.0 | 0    | —   | 6.0  | 2.0 | 4.5 | 1.9 | 73 | 72 | 3.9 | 0.21  | 97  |
| 25 | 0.8 | 0    | —   | 12   | 1.9 | 0    | —   | 4.5 | 1.9 | 88 | 86 | 5.2 | 0.13  | 98  |
| 26 | 0.8 | 12   | 1.9 | 0    | —   | 0    | —   | 4.4 | 2.0 | 65 | 64 | 3.8 | −0.09 | 97  |
| 27 | 0.8 | 0    | —   | 0    | —   | 6.0  | 2.0 | 4.7 | 3.0 | 88 | 86 | 3.9 | 0.23  | 100 |
| 28 | 0.8 | 6.0  | 3.0 | 0    | —   | 0    | —   | 4.8 | 2.9 | 75 | 73 | 3.9 | 0.14  | 99  |
| Com. Ex. | | | | | | | | | | | | | | |
| 7  | 0.8 | 0    | —   | 0    | —   | 0    | —   | 5.1 | —   | 52 | 52 | 2.8 | 0.01  | 98  |
| 8  | 0.8 | 0.03 | 3.0 | 0    | —   | 0    | —   | 5.0 | 3.0 | 53 | 53 | 2.9 | 0.06  | 98  |
| 9  | 0.8 | 30   | 3.0 | 0    | —   | 0    | —   | 3.5 | 7.1 | 76 | 48 | 6.7 | 1.60  | 97  |
| 10 | 0.8 | 0    | —   | 0.03 | 2.9 | 0    | —   | 4.9 | 2.9 | 51 | 51 | 2.9 | 0.05  | 98  |
| 11 | 0.8 | 0    | —   | 30   | 2.9 | 0    | —   | 3.9 | 8.6 | 63 | 39 | 6.9 | 2.10  | 96  |
| 12 | 0.8 | 0    | —   | 0    | —   | 0.03 | 3.2 | 5.0 | 3.2 | 53 | 53 | 2.9 | 0.01  | 98  |
| 13 | 0.8 | 0    | —   | 0    | —   | 30   | 3.2 | 4.0 | 9.7 | 71 | 51 | 5.7 | −0.51 | 98  |
| 14 | 0.8 | 6.0  | 3.0 | 0    | —   | 0    | —   | 4.4 | 4.1 | 67 | 47 | 4.0 | 0.98  | 100 |
| 15 | 0.8 | 12   | 3.0 | 0    | —   | 0    | —   | 4.3 | 6.2 | 81 | 36 | 4.6 | 1.50  | 100 |
| 16 | 0.8 | 24   | 4.0 | 0    | —   | 0    | —   | 4.3 | 9.0 | 66 | 39 | 5.8 | 0.39  | 97  |
| 17 | 0.8 | 0    | —   | 0    | —   | 12   | —   | 4.7 | 7.6 | 74 | 49 | 4.2 | 0.24  | 96  |
| 18 | 0.8 | 0    | —   | 24   | —   | 0    | 3.9 | 4.3 | 5.6 | 67 | 53 | 4.8 | −0.48 | 98  |

As has been described above in detail, according to the present invention, there is provided a dense SiC-based pressureless sintered product having a high toughness, a high strength, and a high oxidation resistance.

What is claimed is:

1. A SiC-based pressureless sintered product, comprising:
   a sintered product main component containing grains of at least one additive selected from the group consisting of TaC in an amount of 0.06 to 15 mol %, and $NbB_2$, $VB_2$ and WB each in an amount of 0.06 to 25 mol %, and in the event of a combination of TaC with a boride, the total amount of additive ranging from 0.06 to 25 mol %, and the balance of SiC sintered grains constituting a SiC matrix; and
   a sintering assistant containing B and C components;
   said additive grains having a maximum grain size not greater than the average grain size of the SiC sintered grains, said sintered product having a density of at least 90% of its theoretical density and having a residual oxygen content of 0.2 atomic percent or less, based on the main component.

2. The sintered product according to claim 1, wherein said SiC sintered grains have an average grain size of 5 μm or less.

3. The sintered product according to claim 1, wherein said SiC sintered grains have an average grain size of 2 μm or less.

4. The sintered product according to claim 1, wherein said SiC sintered grains have an aspect ratio of 5 or less.

5. The sintered product according to claim 1, wherein said SiC sintered grains have an aspect ratio of 3 or less.

6. The sintered product according to claim 1, wherein said sintering assistant comprises an boron compound.

7. The sintered product according to claim 6, wherein said boron compound is present in an amount of 0.06 to 5.0 atomic % in terms of boron atoms.

8. The sintered product according to claim 6, wherein said boron compound is present in an amount of 0.06 to 1.0 atomic % in terms of boron atom.

9. The sintered product according to claim 6, wherein said boron compound is present in an amount of 0.06 to 0.6 atomic % in terms of boron atoms.

10. The sintered product according to claim 1, wherein said sintering assistant comprises a carbon compound.

11. The sintered product according to claim 10, wherein said carbon compound is present in an amount of 0.06 to 5.0 atomic % in terms of carbon atoms.

12. The sintered product according to claim 1, which has a density corresponding to 95 % or more of its theoretical density.

13. The sintered product according to claim 1, wherein said additive is TaC and is present in an amount of 0.06 to 15 mol % in the main component.

14. The sintered product according to claim 1, wherein said additive is the boride and is present in an amount of 0.06 to 25 mol % in the main component.

* * * * *